(12) United States Patent
Takahashi et al.

(10) Patent No.: US 12,441,874 B2
(45) Date of Patent: Oct. 14, 2025

(54) RESIN COMPOSITION, RESIN-COATING MATERIAL, INSULATED WIRE, VEHICLE WIRE HARNESS, AND METHOD OF PRODUCING INSULATED WIRE TO BE USED IN VEHICLE WIRE HARNESS

(71) Applicants: FURUKAWA ELECTRIC CO., LTD., Tokyo (JP); FURUKAWA AUTOMOTIVE SYSTEMS INC., Shiga (JP)

(72) Inventors: Kenji Takahashi, Tokyo (JP); Michimasa Watanabe, Tokyo (JP); Akihiro Nagao, Inukami-gun (JP); Hideyuki Osuga, Inukami-gun (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 244 days.

(21) Appl. No.: 18/195,148

(22) Filed: May 9, 2023

(65) Prior Publication Data
US 2023/0272199 A1    Aug. 31, 2023

Related U.S. Application Data

(63) Continuation of application No. PCT/JP2022/043748, filed on Nov. 28, 2022.

(30) Foreign Application Priority Data

Nov. 30, 2021 (JP) ................. 2021-194495

(51) Int. Cl.
| | | |
|---|---|---|
| C08K 3/08 | (2006.01) | |
| B29C 48/00 | (2019.01) | |
| C08K 3/16 | (2006.01) | |
| C08K 5/05 | (2006.01) | |
| C08K 5/3445 | (2006.01) | |
| C08K 5/372 | (2006.01) | |
| C08L 23/0853 | (2025.01) | |
| B29K 23/00 | (2006.01) | |
| B29L 31/30 | (2006.01) | |

(52) U.S. Cl.
CPC ........ *C08L 23/0853* (2013.01); *B29C 48/022* (2019.02); *C08K 3/08* (2013.01); *C08K 3/16* (2013.01); *C08K 5/05* (2013.01); *C08K 5/3445* (2013.01); *C08K 5/372* (2013.01); *B29K 2023/06* (2013.01); *B29K 2023/083* (2013.01); *B29L 2031/30* (2013.01); *C08K 2003/0875* (2013.01); *C08K 2201/014* (2013.01); *C08L 2201/02* (2013.01); *C08L 2203/206* (2013.01); *C08L 2312/00* (2013.01)

(58) Field of Classification Search
CPC . H01B 3/307; H01B 3/30; H01B 3/44; H01B 3/441; H01B 7/28; H01B 7/282; H01B 7/295; H01B 13/012; H01B 13/14; H01B 13/145; C08L 23/0853; C08L 2201/02; C08L 2203/206; C08L 2312/00; C08K 3/08; C08K 3/16; C08K 3/22; C08K 3/26; C08K 3/28; C08K 3/38; C08K 3/34; C08K 5/05; C08K 5/15; C08K 5/1535; C08K 5/1545; C08K 5/17; C08K 5/34; C08K 5/3445; C08K 5/372; C08K 5/45; B29K 2023/06; B29K 2023/083; B29K 2003/0875
USPC ................. 174/110 R–122 SR; 428/389, 461
See application file for complete search history.

(56) References Cited

U.S. PATENT DOCUMENTS

| | | | | |
|---|---|---|---|---|
| 4,857,673 A | * | 8/1989 | Wilkus ..................... | H01B 3/44 524/412 |
| 2002/0033272 A1 | * | 3/2002 | Hashimoto ............ | H01B 3/441 174/137 B |
| 2011/0144244 A1 | * | 6/2011 | Lee ........................ | C08K 3/016 524/424 |
| 2012/0273268 A1 | * | 11/2012 | Shimada ................ | H01B 3/441 523/435 |

(Continued)

FOREIGN PATENT DOCUMENTS

| | | |
|---|---|---|
| JP | 60-243154 A | 12/1985 |
| JP | 2000-129064 A | 5/2000 |

(Continued)

OTHER PUBLICATIONS

International Search Report for PCT/JP2022/043748 (PCT/ISA/210) mailed on Jan. 17, 2023.

(Continued)

*Primary Examiner* — William H. Mayo, III
(74) *Attorney, Agent, or Firm* — Birch, Stewart, Kolasch & Birch, LLP

(57) ABSTRACT

A resin composition including an ethylene-vinyl acetate copolymer resin as a resin component, an imidazole compound, a phenol compound, and a thioether compound as an antioxidant, and a bromine compound and an antimony compound as a flame retardant. The resin composition has a content of the imidazole compound of 14 to 24 parts by mass, a content of the phenol compound of 1.0 to 2.0 parts by mass, a content of the thioether compound of 0.3 to 0.9 parts by mass, a content of the bromine compound of 15 to 30 parts by mass, and a content of the antimony compound of 5 to 15 parts by mass with respect to 100 parts by mass of a total content of the resin component in the resin composition.

11 Claims, No Drawings

(56) References Cited

U.S. PATENT DOCUMENTS

| | | | | |
|---|---|---|---|---|
| 2013/0273367 A1* | 10/2013 | Shimada | ............... | C08L 23/26 |
| | | | | 428/389 |
| 2017/0365378 A1* | 12/2017 | Kaga | ..................... | C08G 73/10 |
| 2020/0079969 A1* | 3/2020 | Takahashi | ............. | C08K 13/02 |

FOREIGN PATENT DOCUMENTS

| | | | | | |
|---|---|---|---|---|---|
| JP | 2002-42574 A | | 2/2002 | | |
| JP | 2002-324442 A | | 11/2002 | | |
| JP | 2009051918 A | * | 3/2009 | ............... | C08K 3/22 |
| JP | 2009286903 A | * | 12/2009 | ............... | C08K 3/20 |
| JP | 2019-14794 A | | 1/2019 | | |
| WO | WO 2019/009294 A1 | | 1/2019 | | |

OTHER PUBLICATIONS

Written Opinion of the International Searching Authority for PCT/JP2022/043748 (PCT/ISA/237) mailed on Jan. 17, 2023.

* cited by examiner

RESIN COMPOSITION, RESIN-COATING MATERIAL, INSULATED WIRE, VEHICLE WIRE HARNESS, AND METHOD OF PRODUCING INSULATED WIRE TO BE USED IN VEHICLE WIRE HARNESS

CROSS-REFERENCE TO RELATED APPLICATIONS

This application is a Continuation of PCT International Application No. PCT/JP2022/043748 filed on Nov. 28, 2022, which claims priority under 35 U.S.C. § 119 (a) to Japanese Patent Application No. 2021-194495 filed in Japan on Nov. 30, 2021. Each of the above applications is hereby expressly incorporated by reference, in its entirety, into the present application.

FIELD OF THE INVENTION

The present invention relates to a resin composition, a resin-coating material, an insulated wire, a vehicle wire harness, and a method of producing an insulated wire to be used in a vehicle wire harness.

BACKGROUND OF THE INVENTION

Insulated wires with flame retardancy are widely used for various kinds of white goods (house appliance) and OA equipment, etc. Further, characteristics such as flame retardancy, heat resistance, flexibility (a flexible property), and mechanical characteristics are also required for the insulated wires to be used in automobiles and the like. In the past, resin compositions for realizing insulated wires with flame retardancy, heat resistance, flexibility (a flexible property), and mechanical characteristics by using them as a coating material for the conductor have been studied and many reports thereon have been published.

As a resin composition included in an insulated wire having such desired characteristics, for example, compositions containing a resin such as polyethylene or an ethylene-vinyl acetate copolymer as a base are widely used.

For example, Patent Literature 1 describes that when a resin composition containing an ethylene-vinyl acetate copolymer, a specific flame retardant, multiple kinds of specific aging retardant, a copper inhibitor, and a crosslinking aid in specific amounts is prepared, the resin composition is less likely to adhere to a processing machine (the resin composition is excellent in processing adhesion) in the preparation of this resin composition, and thus the amount of the composition remaining in the processing machine can be reduced, and further by applying the resin composition to the surface of a conductor etc., and by crosslinking the resin composition, an insulated wire can be obtained that exhibits desired excellent characteristics in all of flexibility, hardness, degree of cross-linkage, abrasion resistance, flame retardancy, cold resistance, and heat resistance. This resin composition contains, with respect to 90 to 100 parts by mass of the ethylene-vinyl acetate copolymer, 15 to 30 parts by mass of a bromine-based flame retardant, 5 to 15 parts by mass of antimony trioxide, 6 to 12 parts by mass of a benzimidazole-based aging retardant, 2 to 4 parts by mass of a phenol-based aging retardant, 2 to 4 parts by mass of a thioether-based aging retardant, 0.5 to 2 parts by mass of the copper inhibitor, and 3 to 6 parts by mass of the crosslinking aid.

Patent Literature 2 describes a flame retardant resin composition that, when used as a coating material for a conductor, enables to obtain an insulated wire that is excellent in heat-resistant life, flame retardancy, and compatibility with polyvinyl chloride (PVC) and does not cause problems such as elution of heavy metal compounds and generation of a large amount of smoke and corrosive gasses at the time of disposal such as landfill and incineration. This flame retardant resin composition contains, with respect to 100 parts by mass of an ethylene-vinyl acetate copolymer or a mixture of the ethylene-vinyl acetate copolymer and a polyolefin, whose vinyl acetate content is 10 mass % or more and less than 40 mass %, 50 to 160 parts by mass of a metal hydrate, 2 to 10 parts by mass of a phenol-based antioxidant, 10 to 25 parts by mass of a benzimidazole-based antioxidant, and 0 to 10 parts by mass of a thioether-based antioxidant.

Patent Literature 3 describes an insulated wire that has excellent flame retardancy, tensile properties, heat resistance, and electrical properties, and does not cause elution of heavy metal compounds and generation of a large amount of smoke and corrosive gases at the time of disposal such as landfill and incineration. In this insulated wire, a conductor is covered with a crosslinked body of a composition containing 150 to 300 parts by mass of a metal hydrate, 1 to 6 parts by mass of a phenol-based antioxidant, and 12 to 30 parts by mass of a thioether-based antioxidant with respect to 100 parts by mass of a base resin containing an ethylene-vinyl acetate copolymer and having a vinyl acetate content of 40 mass % or more.

Patent Literature 4 describes a non-halogen flame retardant wire/cable excellent in durability against corrosive gases such as NOx and SOx. This non-halogen flame retardant wire/cable contains a non-halogen flame retardant in an insulator or a sheath, and the insulator or the sheath is a composition obtained by mixing 300 parts by weight or less of the non-halogen flame retardant with respect to 100 parts by weight of rubber or plastic and adding 0.1 to 10 parts by weight of each of a hindered phenol-based antioxidant and a thioether-based antioxidant.

CITATION LIST

Patent Literatures

Patent Literature 1: JP-A-2019-14794 ("JP-A" means an unexamined published Japanese patent application)
Patent Literature 2: JP-A-2009-286903
Patent Literature 3: JP-A-2002-42574
Patent Literature 4: JP-A-2002-324442

SUMMARY OF THE INVENTION

Technical Problem

With the recent progress of development of hybrid vehicles etc., insulated wires used for automobiles etc. are required to have more excellent characteristics in terms of flexibility, hardness, degree of cross-linkage, abrasion resistance, flame retardancy, cold resistance, and heat resistance etc. than ever before. In terms heat resistance, insulated wires used for automobiles etc. are required to meet the Japanese Automotive Standards Organization (JASO) standard D 624 (2015) heat resistance class 150° C., or ISO 6722 (2006) heat resistance class D.

From the viewpoint of terminal sealing characteristics of an insulated wire (preventing water from entering a connection from the outside), it is known that a wire coating is compressed and deformed using a rubber material or the like to ensure the waterproof performance of the wire coating. In order to ensure such waterproof performance, a high degree of cross-linkage (gel fraction) is to be designed. In particular, many resins tend to have a high heat deformation rate under a high-temperature environment, and crush (deformation) of an insulator coating of an insulated wire under such a condition may cause deterioration of the sealing characteristics with a connector.

In general, in processing to a wire harness and in harness assembly, harness processing such as cable terminal processing, connector insertion, and cable routing is often performed manually, and particularly in harness processing at the time, such as the summer season, when the surrounding environment greatly changes, a passing property (slipperiness) between a wire harness member and a wire cable or between wires is important from the viewpoints of work efficiency, load on a worker, assembly accuracy, and the like.

In view of the above circumstances, the present invention provides a resin composition that is used for forming an insulating film (resin-coating material layer) of an insulated wire to enable to obtain an insulated wire excellent in heat resistance, crosslinkability in the insulating film, and a passing property (slipperiness) between the resulting insulated wires under a high-temperature environment. The present invention further provides a resin-coating material using the resin composition, an insulated wire including the resin-coating material around a conductor, a vehicle wire harness including the insulated wire, and a method of producing an insulated wire to be used in a vehicle wire harness.

Solution to Problem

As a result of intensive studies to solve the above-described problems, the present inventors have found that an insulated wire having excellent heat resistance, high cross-linkability, and an excellent passing property can be provided when an insulating film of the insulated wire is formed using a resin composition obtained by using an ethylene-vinyl acetate copolymer resin as a base resin, blending an imidazole compound, a phenol compound, and a thioether compound in specific amounts, and further blending a bromine compound and an antimony compound in specific amounts. The present inventors further intensively conducted studies based on these findings, and have completed the present invention.

That is, the above-described problems have been solved by the following means.
<1>
A resin composition, containing:
an ethylene-vinyl acetate copolymer resin as a resin component;
an imidazole compound, a phenol compound, and a thioether compound as an antioxidant; and
a bromine compound and an antimony compound as a flame retardant, wherein the resin composition has a content of the imidazole compound of 14 to 24 parts by mass, a content of the phenol compound of 1.0 to 2.0 parts by mass, a content of the thioether compound of 0.3 to 0.9 parts by mass, a content of the bromine compound of 15 to 30 parts by mass, and a content of the antimony compound of 5 to 15 parts by mass with respect to 100 parts by mass of a total content of the resin component in the resin composition.
<2>
The resin composition described in the item <1>, containing 0.5 to 6.0 parts by mass of a dispersant with respect to 100 parts by mass of the total content of the resin component in the resin composition.
<3>
The resin composition described in the item <1> or <2>, containing a maleic acid-modified polyethylene resin and/or a low density polyethylene resin as the resin component.
<4>
The resin composition described in any one of the items <1> to <3>, wherein the proportion of a vinyl acetate component in the ethylene-vinyl acetate copolymer resin is 30 mass % or less.
<5>
The resin composition described in any one of the items <1> to <4>, wherein a total content of the antioxidants with respect to 100 parts by mass of the total content of the resin component in the resin composition is 20 to 26 parts by mass.
<6>
The resin composition described in any one of the items <1> to <5>, containing at least one kind of a crosslinking aid and a processing aid.
<7>
The resin composition described in any one of the items <1> to <6>, to be used in a vehicle wire harness.
<8>
A resin-coating material obtained by crosslinking the resin composition described in any one of the items <1> to <7>.
<9>
An insulated wire, containing an insulating film including the resin-coating material described in the item <8>.
<10>
A vehicle wire harness, including the insulated wire described in the item <9>.
<11>
A method of producing an insulated wire to be used in a vehicle wire harness, the method including a step of extrusion-coating a conductor with the resin composition described in any one of the items <1> to <7> to provide a resin composition layer and irradiating the resin composition layer with an electron beam of 80 to 250 kGy.

In the description of the present invention, any numerical expressions in a style of " . . . to . . . " will be used to indicate a range including the lower and upper limits represented by the numerals given before and after "to", respectively.

Advantageous Effects of Invention

The resin composition of the present invention is used for forming an insulating film (resin-coating material layer) of an insulated wire to enable to obtain an insulated wire excellent in heat resistance, crosslinkability in the insulating film, and a passing property between the resulting insulated wires. The resin-coating material of the present invention is used as a constituent material of an insulating film of an insulated wire to enable to obtain an insulated wire that exhibits the above-described desired excellent characteristics. The vehicle wire harness of the present invention contains an insulated wire including an insulating film including the resin-coating material, and is excellent in heat resistance, crosslinkability in the insulating film, and a passing property under a high-temperature environment. According to the method of producing an insulated wire to be used in a vehicle wire harness of the present invention, an insulated wire having the above-described excellent characteristics can be obtained.

DESCRIPTION OF EMBODIMENTS

[Resin Composition]

The resin composition of the present invention contains an ethylene-vinyl acetate copolymer resin as a base resin, an imidazole compound, a phenol compound, and a thioether compound as an antioxidant, and a bromine compound and an antimony compound as a flame retardant in specific amounts.

The above-described components and optional components described below may be used singly, or in combination of two or more kinds thereof.

Hereinafter, each component contained in the resin composition of the present invention will be described.

<Ethylene-Vinyl Acetate Copolymer Resin>

The resin composition of the present invention contains at least an ethylene-vinyl acetate copolymer resin as a resin component included in a base resin. The polymerization form of the ethylene-vinyl acetate copolymer resin used in the present invention may be any of block polymerization, random polymerization, and graft polymerization.

The proportion of the content of a vinyl acetate component included in the ethylene-vinyl acetate copolymer is preferably 30 mass % or less, more preferably 25 mass % or less, and still more preferably 20 mass % or less in the ethylene-vinyl acetate copolymer from the viewpoints of adhesion between a resin-coating material and a conductor and a passing property (slipperiness) between a wire harness member and a wire cable or between wires. From the same viewpoint as described above, the proportion of the content of the vinyl acetate component is preferably 7 mass % or more, and more preferably 9 mass % or more. When the proportion of the content of the vinyl acetate component is within the above-described range, the resin-coating material prepared using the resin composition of the present invention can acquire sufficient mechanical characteristics such as tensile strength and tensile elongation, and in addition, the flame retardancy of the insulated wire can be further improved. The proportion of the content of the vinyl acetate component can be determined, for example, from the mass ratio of the raw materials (monomers) in the time of synthesis.

The ethylene-vinyl acetate copolymer resin used in the present invention preferably has a melt flow rate (MFR) of 0.1 to 10 g/10 min (load: 2.16 kg, temperature: 190° C.), and more preferably 0.5 to 5 g/10 min.

When the ethylene-vinyl acetate copolymer resin has a melt flow rate within the above-described preferable range, a load on a kneader or an extruder can be further suppressed at the time of preparing a resin composition and at the time of preparing an insulated wire or a wire harness, and the dispersibility of each component in the resin composition can be further enhanced. The melt flow rate (MFR) can be measured with a method in accordance with JIS K 7210: 2014.

The ethylene-vinyl acetate copolymer resin used in the present invention can be synthesized with an ordinarily used method, and a commercially available product may be used. Specific examples of the commercially available product include EVAFLEX V5274 and EVAFLEX V422 (all trade names) manufactured by DuPont-Mitsui Polychemicals Co., Ltd.

The content of the ethylene-vinyl acetate copolymer resin in the resin component included in the resin composition of the present invention is preferably 80 mass % or more, more preferably 85 mass % or more, and still more preferably 90 mass % or more from the viewpoints of improving the flame retardancy and improving the crosslinkability. The entire resin component contained in the resin composition of the present invention may be the ethylene-vinyl acetate copolymer resin.

<Polyethylene Resin>

The resin composition of the present invention may contain, in addition to the ethylene-vinyl acetate copolymer resin, a polyethylene resin as a resin component other than the ethylene-vinyl acetate copolymer resin. Examples of such a polyethylene resin include a maleic acid-modified polyethylene resin and a low density polyethylene resin. Such polyethylene resins may be used singly, or in combination of two or more kinds thereof. In the resin component included in the resin composition of the present invention, the content of the polyethylene resin is preferably 20 mass % or less, more preferably 15 mass % or less, and still more preferably 12 mass % or less, and can be 1 to 10 mass %, 2 to 8 mass %, or 3 to 5 mass %.

(Maleic Acid-Modified Polyethylene Resin)

When the resin composition of the present invention contains a maleic acid-modified polyethylene resin component as the resin component, the content of the maleic acid-modified polyethylene resin is preferably 20 mass % or less, more preferably 15 mass % or less, and still more preferably 12 mass % or less, and can be 1 to 10 mass %, 2 to 8 mass %, or 3 to 5 mass % in the resin component included in the resin composition of the present invention. When the content of the maleic acid-modified polyethylene resin is within the above-described preferable range, sufficient flexibility can be imparted to an insulated wire having a resin-coating material prepared using the resin composition of the present invention. Further, the resin composition is less likely to adhere to a processing machine (the resin composition is excellent in processing adhesion), and therefore the amount of the composition remaining in the processing machine can be reduced. Further, the compatibility between the resin component in the composition and fillers can be enhanced, and thus the abrasion resistance of the obtained insulated wire can be further improved.

(Low Density Polyethylene Resin)

In the present invention, the term "low density polyethylene resin" means a polyethylene resin having a density of 0.929 g/cm$^3$ or less. Therefore, the term "low density polyethylene resin" in the present invention refers to "very-low-density polyethylene (VLDPE)" and the like in addition to "low density polyethylene (LDPE)".

The low density polyethylene resin used in the present invention preferably has a density range of 0.870 to 0.929 g/cm$^3$, and more preferably has a density range of 0.910 to 0.929 cm$^3$. The density of a polyethylene resin can be determined in accordance with JIS K 7112: 1999.

The low density polyethylene resin may be, for example, a high pressure radical method (high pressure method) low density polyethylene resin or a metallocene-catalyzed linear low density polyethylene resin. Regarding details of such a polyethylene resin, for example, the description in Japanese Patent Application No. 2016-072380 can be referred to.

When the resin composition of the present invention contains a low density polyethylene resin as the resin component, the content of the low density polyethylene resin is preferably 20 mass % or less, more preferably 15 mass % or less, and still more preferably 12 mass % or less, and can be 1 to 10 mass %, 2 to 8 mass %, or 3 to 5 mass % in the resin component included in the resin composition of the present invention.

The polyethylene resin, such as a maleic acid-modified polyethylene resin or a low density polyethylene resin, that can be used in the present invention can be synthesized with an ordinarily used method, and a commercially available product can be used. Specific examples of the commercially available product include PETROTHENE 180R, PETROTHENE 170R, and PETROTHENE 173R manufactured by Tosoh Corporation, SUMIKATHENE F218-0, SUMIKATHENE F200, and SUMIKATHENE G401 manufactured by SUMITOMO CHEMICAL COMPANY, LIMITED, NOVATEC UE320, NOVATEC LF443, NOVATEC LF280H, NOVATEC LF448K1, and ADTEX L6100M manufactured by Japan Polyethylene Corporation, NUC-9060 and ENGAGE-8100 manufactured by NUC Corporation, and NUCG-5130 manufactured by Dow Elastomer (all trade names).

The total content of the resin component contained in the resin composition of the present invention is usually 30 to 80 mass %, and can be 40 to 75 mass % or 50 to 75 mass %.

<Antioxidant>

The resin composition of the present invention contains an imidazole compound (imidazole-based antioxidant), a phenol compound (phenol-based antioxidant), and a thioether compound (thioether-based antioxidant) in specific amounts as an antioxidant (aging retardant). Each of these antioxidants is blended in a specific amount, and thus in the resulting resin-coating material, the heat resistance, the crosslinkability, and the slippage can be further improved while occurrence of bleeding is suppressed.

Each of the antioxidants will be described below.

(Imidazole Compound)

Examples of the imidazole compound (compound having a benzimidazole skeleton) used in the resin composition of the present invention include 2-sulfanyl benzimidazole, 2-sulfanyl methylbenzimidazole, 4-sulfanyl methylbenzimidazole, 5-sulfanyl methylbenzimidazole, and zinc salts thereof. Among them, 2-sulfanyl benzimidazole and its zinc salt are preferable.

In the present invention, a commercially available imidazole compound may be used. Examples of the commercially available product include NOCRAC MBZ (trade name, manufactured by OUCHI SHINKO CHEMICAL INDUSTRIAL CO., LTD.)

The content of the imidazole compound is 14 to 24 parts by mass with respect to 100 parts by mass of the total content of the resin component included in the resin composition of the present invention. The content is preferably 16 to 24 parts by mass, and more preferably 16 to 20 parts by mass from the viewpoints of further improving the heat resistance and the crosslinkability and suppressing dispersibility in the resin and occurrence of bleeding.

(Phenol Compound)

Examples of the phenol compound (compound having a phenol skeleton) used in the resin composition of the present invention include triethyleneglycol-bis(3-(3-t-butyl-5-methyl-4-hydroxyphenyl)propionate), 1,6-hexanediol-bis(3-(3,5-di-t-butyl-4-hydroxyphenyl)propionate), pentaerythrityl-tetrakis(3-(3,5-di-t-butyl-4-hydroxyphenyl) propionate), octadecyl-3-(3,5-di-t-butyl-4-hydroxyphenyl) propionate, 1,3,5-trimethyl-2,4,6-tris(3,5-di-t-butyl-4-hydroxybenzyl)benzene, 1,3,5-tris-(3,5-di-t-butyl-4-hydroxybenzyl)isocyanurate, and isooctyl-3-(3,5-di-t-butyl-4-hydroxyphenyl)propionate, and one or more kinds thereof can be used. Among them, phenol compounds having two or more of 3,5-di-t-butyl-4-hydroxyphenyl groups or 3,5-di-t-butyl-4-hydroxybenzyl groups are preferable, and 1,3,5-tris-(3,5-di-t-butyl-4-hydroxybenzyl)isocyanurate and pentaerythrityl-tetrakis(3-(3,5-di-t-butyl-4-hydroxyphenyl) propionate) are particularly preferable, from the viewpoint of imparting high heat resistance to a vehicle wire harness. Among compounds having a phenol skeleton (phenol-based antioxidants), compounds that are a triazole-based compound, an N,N'-diacylhydrazine compound, or a dihydrazide compound and used as a copper inhibitor as described below are treated not as a phenol compound but as a copper inhibitor in the present invention.

In the present invention, a commercially available phenol compound may be used. Examples of the commercially available product include Irganox 1010 (trade name, manufactured by BASF) and ADK STAB AO-20 (trade name, manufactured by ADEKA Corporation).

The content of the phenol compound is 1.0 to 2.0 parts by mass with respect to 100 parts by mass of the total content of the resin component included in the resin composition of the present invention. The content is preferably 1.5 to 2.0 parts by mass from the viewpoints of further improving the heat resistance and the crosslinkability and suppressing occurrence of bleeding.

(Thioether Compound)

Examples of the thioether compound (compound having a thioether bond) used in the resin composition of the present invention include thioether compounds to be used as an antioxidant for a wire coating material. Examples of the thioether compound include dilauryl 3,3'-thiodipropionate, dimyristyl 3,3'-thiodipropionate, distearyl 3,3'-thiodipropionate, and 2,2-bis{[3-(dodecylthio)-1-oxopropoxy]methyl}propane-1,3-diyl bis[3-dodecylthiopropionate] (another name: bis[3-(dodecylthio)propionic acid]2,2-bis[[3-(dodecylthio)-1-oxopropyloxy]methyl]-1,3-propanediyl), and one or more kinds thereof can be used. Among them, 2,2-bis{[3-(dodecylthio)-1-oxopropoxy]methyl}propane-1, 3-diyl bis[3-dodecylthiopropionate] is preferable from the viewpoint of long-term thermal stability.

In the resin composition of the present invention, a commercially available thioether compound may be used. Examples of the commercially available product include ADK STAB AO-412S (trade name, manufactured by ADEKA Corporation).

The content of the thioether compound is 0.3 to 0.9 parts by mass with respect to 100 parts by mass of the total content of the resin component included in the resin composition of the present invention. In an insulated wire having a resin composition in which a thioether compound is blended at a high content, the thioether compound is likely to bleed to the surface of an insulating film. When such an insulated wire is stored at a high temperature, the slippage significantly deteriorates (the dynamic coefficient of friction is significantly increased) to hinder assembly of the wire. Therefore, when the content of the thioether compound is within the above-described range, a resin composition excellent in heat resistance and also excellent in slippage can be obtained. The content is preferably 0.3 to 0.6 parts by mass from the viewpoints of further improving the heat resistance, and improving the slippage and suppressing inhibition of crosslinking.

(Other Antioxidants)

The resin composition of the present invention may contain, in addition to the imidazole compound, the phenol compound, and the thioether compound, an antioxidant other than these compounds. Examples of such an antioxidant include copper inhibitors and zinc compounds, and one or more kinds thereof can be used. Specific examples of the zinc compounds include zinc sulfide and zinc oxide.

(Copper Inhibitor)

Examples of the copper inhibitor usable in the resin composition of the present invention include triazole-based compounds, N,N'-diacylhydrazine compounds, and dihydrazide compounds. Examples of a commercially available product include ADK STAB CDA series (CDA-1, CDA-6, and CDA-10 (all trade names)) that are heavy metal deactivators manufactured by ADEKA Corporation, and Irganox MD1024 (trade name) manufactured by BASF.

When the resin composition of the present invention contains a copper inhibitor, the content of the copper inhibitor is preferably 0.5 to 2.0 parts by mass with respect to 100 parts by mass of the total content of the resin component from the viewpoint of deterioration of heat resistance caused by contact with a metal ion such as a copper ion.

(Zinc Compound)

Examples of the zinc compound usable in the resin composition of the present invention include zinc sulfide and zinc oxide. Among them, zinc sulfide and/or zinc oxide is preferably contained in the resin composition of the present invention. Examples of commercially available products of such zinc sulfide and zinc oxide include Sachtolith HD-S (trade name) manufactured by Sachtleben Chemie Gmbh and Zinc sulfide manufactured by Taizhou ATS Optical Material Co., Ltd. In the present invention or the present description, examples of the zinc compound do not include zinc salts with an imidazole compound that are to be used as an imidazole compound, and zinc stearate to be used as a processing aid (lubricant).

When the resin composition of the present invention contains a zinc compound, the content of the zinc compound is preferably 1.0 to 10 parts by mass, and more preferably 3.0 to 5.0 parts by mass with respect to 100 parts by mass of the total content of the resin component from the viewpoint of heat resistance.

The total content of the antioxidants is preferably 10 to 35 parts by mass, more preferably 15 to 30 parts by mass, and still more preferably 20 to 26 parts by mass with respect to 100 parts by mass of the total content of the resin component included in the resin composition of the present invention.

<Flame Retardant>

The resin composition of the present invention contains a bromine compound (bromine-based flame retardant) and an antimony compound (antimony-based flame retardant) as a flame retardant. The amount ratio of the bromine compound and the antimony compound in the resin composition is preferably such that the amount of the bromine element is 2 to 5 times an amount of the antimony element of 1 mol.

The total content of the flame retardant in the resin composition of the present invention is preferably 20 to 45 parts by mass, more preferably 30 to 45 parts by mass, and still more preferably 31 to 42 parts by mass with respect to 100 parts by mass of the total content of the resin.

(Bromine Compound)

Examples of the bromine compound used as a flame retardant in the present invention include organic bromine-containing flame retardants such as a brominated N,N'-ethylene bisphthalimide and its derivative compounds (referred to as "brominated N,N'-ethylene bisphthalimide compounds" collectively), N,N'-bis(bromophenyl)terephthalamide and its derivative compounds (referred to as "N,N'-bis(bromophenyl)terephthalamide compounds" collectively), a brominated bisphenol and its derivative compounds (referred to as "brominated bisphenol compounds" collectively), and a 1,2-bis(bromophenyl) alkane. Among them, for example, a brominated N,N'-ethylene bisphthalimide and/or 1,2-bis(bromophenyl)ethane are preferably used.

As the bromine compound used in the resin composition of the present invention, a commercially available bromine compound may be used. Examples of the commercially available product include SAYTEX 8010 (trade name, manufactured by Albemarle Corporation).

The content of the bromine compound in the resin composition of the present invention is 15 to 30 parts by mass with respect to 100 parts by mass of the total content of the resin component. The content is preferably 20 to 30 parts by mass, and more preferably 24 to 30 parts by mass from the viewpoint of flame retardancy.

(Antimony Compound)

Examples of the antimony compound include antimony trioxide, antimony tetraoxide, antimony pentoxide, and sodium antimonate. It is considered that antimony reacts with chlorine (halogen), the generated gas blocks oxygen, and thus formation of a carbonized layer is promoted and free radicals are trapped (function of stopping thermal decomposition chain reaction). Among the above-described antimony compounds, antimony trioxide is preferably contained in the present invention from the viewpoint of forming a further stable carbonized layer.

In the present invention, a commercially available antimony trioxide may be used. Examples of the commercially available product include PATOX-C (trade name, manufactured by Nihon Seiko Co., Ltd.).

When the resin composition of the present invention contains an antimony compound, the content is 5 to 15 parts by mass with respect to 100 parts by mass of the total content of the resin component. The content is preferably 8 to 13 parts by mass, more preferably 9 to 12 parts by mass, and still more preferably 10 to 12 parts by mass from the viewpoint of flame retardancy.

(Another Flame Retardant)

The resin composition of the present invention may contain, in addition to the bromine compound and the antimony compound, a flame retardant that can be usually used in an insulating film of an insulated wire, other than the bromine compound and the antimony compound. Examples of such a flame retardant include metal hydroxides (hydroxide-based flame retardants) such as magnesium hydroxide and aluminum hydroxide. When the resin composition of the present invention contains a hydroxide-based flame retardant, the content is preferably 5 parts by mass or less, and more preferably 3 parts by mass or less with respect to 100 parts by mass of the total content of the resin component.

<Other Components>

The resin composition of the present invention may contain components other than the above-described components, such as a crosslinking aid and a processing aid described below, as long as an effect of the present invention is not impaired. In addition, components such as a plasticizer, a filler, and a pigment may be contained as necessary.

<Crosslinking Aid>

The resin composition of the present invention also preferably contains a crosslinking aid. Examples of the crosslinking aid include polyfunctional compounds, and compounds having 2 or more (preferably 3 or more, and more preferably 3 to 6) ethylenically unsaturated bonds (carbon-carbon double bonds) in the molecule are preferable.

Specific examples of the crosslinking aid include (meth) acrylate compounds such as polypropylene glycol di(meth)acrylate and trimethylolpropane tri(meth)acrylate, allyl compounds such as triallyl cyanurate, maleimide compounds, and divinyl compounds.

In the present invention, a commercially available crosslinking aid may be used. Examples of the commercially available product include Ogmont T200 (trade name, manufactured by SHIN-NAKAMURA CHEMICAL Co., Ltd.).

The resin composition of the present invention preferably contains a crosslinking aid at a content of 2 to 6 parts by mass, and more preferably 3 to 5 parts by mass with respect to 100 parts by mass of the total content of the resin component.

<Processing Aid>

The resin composition of the present invention also preferably contains a processing aid. Preferred examples of the processing aid include metal soaps (lubricants).

Examples of the metal soap (lubricant) usable in the resin composition of the present invention include calcium stearate, zinc stearate, and magnesium stearate.

In the present invention, a commercially available metal soap may be used. Examples of the commercially available product include SHINACA LEAD ZS-101 (trade name, manufactured by Shinagawa Chemical industries Co., Ltd.).

When the resin composition of the present invention contains a lubricant, the content is preferably 0.5 to 2 parts by mass with respect to 100 parts by mass of the total content of the resin component.

<Dispersant>

The resin composition of the present invention also preferably contains a dispersant. When the resin composition of the present invention contains a dispersant, reaggregation of an additive such as a flame retardant or an antioxidant can be prevented to improve the dispersibility of each component in the polymer, and thus the resin composition can be excellent in processability in producing a compound using a feeder ruder or a twin-screw extruder, and the heat resistance can be further enhanced.

The dispersant usable in the present invention is not particularly limited, and a dispersant can be used that is usually blended in a resin composition. The dispersant is preferably a wet dispersant from the viewpoint of further suppressing reaggregation of an additive. The wet dispersant is an additive having both a function as a wet material that acts as a surfactant to enhance the wettability of the dispersoid to the resin component and a function of preventing aggregation of the dispersoid by an action such as electrical repulsion or steric hindrance. The function as a wet material is usually performed by a chain compatible with the resin component, and the function of preventing aggregation of the dispersoid is usually performed by a group adsorptive to the dispersoid. Examples of the commercially available wet dispersant include BYK-MAX D 4221 and BYK-MAX P 4102 (all trade names, manufactured by BYK Japan KK.).

When the resin composition of the present invention contains a dispersant, the content is preferably 0.5 to 6.0 parts by mass, and more preferably 1.0 to 6.0 parts by mass with respect to 100 parts by mass of the total content of the resin component from the viewpoints of further improving the heat resistance and suppressing generation of a bloom and inhibition of crosslinking.

<Additive>

In the resin composition of the present invention, various additives, for example, an ultraviolet absorber, a plasticizer, a filler, and a pigment may be appropriately blended as needed as long as an effect of the present invention is not impaired.

[Method of Producing of Resin Composition]

The resin composition of the present invention can be obtained by preparing components such as a resin, an antioxidant, and a flame retardant, and as needed, the above-described optional components, and melt-mixing the components with an ordinarily used kneading equipment such as a batch-type kneader such as a roll, a kneader, or a Banbury mixer or a twin-screw extruder.

[Insulated Wire]

The insulated wire of the present invention has a layer including a resin-coating material obtained by crosslinking the resin composition of the present invention, on the surface of a conductor (whose examples include a conductor bundle and a fiber core wire). Meanwhile, the insulated wire of the present invention may have an interlayer or a shielding layer between the conductor and the layer including the resin-coating material.

Any conductor may be used as long as the conductor has a shape and a material that are generally used in an insulated wire to be used in a vehicle wire harness. The conductor may be a single wire or a stranded wire, and may be a bare wire or a tin-plated or enamel-coated wire. Examples of the conductor-forming metal materials include an annealed copper, a copper alloy, and aluminum.

The thickness of the layer including the resin-coating material that is formed on the periphery of the conductor is not particularly limited. However, usually it is about 0.15 to 5 mm. When the resin composition of the present invention is used, even if the thickness of the resin coating layer is thin, there is an advantage that an insulated wire can be obtained that is excellent in flexibility, hardness, degree of crosslinkage, flame retardancy, cold resistance, and heat resistance.

[Vehicle Wire Harness]

In the present invention or the present description, the term "vehicle wire harness" is a generic term for wire bundles routed in various places, such as an engine room, an instrument panel, and the inside of a door, in a vehicle according to its environmental performance. The vehicle wire harness of the present invention includes the insulated wire of the present invention. The resin composition of the present invention is excellent in appearance, and has excellent flame retardancy and excellent mechanical characteristics. Therefore, a wire harness incorporating an insulated wire having a layer including a resin-coating material obtained by crosslinking the resin composition of the present invention can be suitably used for vehicle applications.

Hereinafter, the vehicle wire harness may be referred to simply as "wire harness" in several cases.

[Method of Producing Insulated Wire to be Used in Vehicle Wire Harness]

The insulated wire to be used in a vehicle wire harness of the present invention can be obtained through a step of extrusion-coating a conductor with the resin composition of the present invention to provide a resin composition layer and irradiating the resin composition layer with an electron beam of 80 to 250 kGy. This electron beam irradiation causes a crosslinking reaction in the resin composition layer to form a resin-coating material layer.

The crosslinking reaction by electron beam irradiation can be carried out with a normal method under normal conditions. The electron beam-irradiation conditions are preferably 80 to 200 kGy, and more preferably 80 to 160 kGy. The accelerating voltage is preferably 300 to 3,000 keV, and more preferably 500 to 2,500 keV.

Further, a multilayer structure may be formed by providing, for example, an interlayer or a shielding layer between a conductor and a coating layer or between coating layers.

The conditions for extrusion-forming the resin composition of the present invention are not particularly limited, as long as the resin composition of the present invention can be extruded. However, from the points that a load on an extruder (extrusion machine) can be lowered and a shape retaining property can be secured, the extruding temperature (head part) is preferably 100 to 230° C., and more preferably 120 to 200° C.

Other conditions for the extrusion forming can be appropriately set according to the purpose.

The screw configuration of the extruder is not particularly limited, and an ordinarily used full flight screw, double flight screw, tip-double flight screw, maddock screw, and the like may be used.

EXAMPLES

The present invention will be described in more detail based on the following Examples and Comparative Examples, but the present invention is not limited thereto.

Examples 1 to 13 and Comparative Examples 1 to 12

Tables 1 and 2 below show the materials for preparation of the resin compositions of Examples 1 to 13 and Comparative Examples 1 to 12. Details of the materials used are as follows. Note that the following items (1) to (14) correspond to the items (1) to (14) in Tables 1 and 2 below.
<Used Materials>
(Resin)
(1): Ethylene-vinyl acetate copolymer 1, EVAFLEX V5274 (trade name), content of vinyl acetate component: 17 mass %, manufactured by DuPont-Mitsui Polychemicals Co., Ltd.
(2): Ethylene-vinyl acetate copolymer 2, EVAFLEX V422 (trade name), content of vinyl acetate component: 20 mass %, manufactured by DuPont-Mitsui Polychemicals Co., Ltd.
(3): Maleic acid-modified polyethylene, ADTEX L6100M (trade name), manufactured by Japan Polyolefins Co., Ltd.
(4): Linear low density polyethylene (LLDPE), NOVATEC UE320 (trade name), density: 0.922 g/cm$^3$, manufactured by Japan Polyethylene Corporation
(Flame Retardant)
(5): 1,2-Bis(pentabromophenyl)ethane, SAYTEX 8010 (trade name), manufactured by Albemarle Corporation
(6): Antimony trioxide, PATOX-C (trade name), manufactured by Nihon Seiko Co., Ltd.
(Antioxidant)
(7): Zinc salt of 2-mercapto benzimidazole, NOCRAC MBZ (trade name), manufactured by OUCHI SHINKO CHEMICAL INDUSTRIAL CO., LTD.
(8): Pentaerythrityl-tetrakis(3-(3,5-di-t-butyl-4-hydroxyphenyl)propionate), Irganox 1010 (trade name), manufactured by BASF
(9): 2,2-Bis{[3-(dodecylthio)-1-oxopropoxy]methyl}propane-1,3-diyl bis[3-(dodecylthio)propionate], ADK STAB AO-412S (trade name), manufactured by ADEKA Corporation
(10): 2',3-Bis{3-(3,5-di-t-butyl-4-hydroxyphenyl)propionyl}propionohydrazide, Irganox MD1024 (trade name), manufactured by BASF
(11): Zinc sulfide, Sachtolith HD-S (trade name), manufactured by Sachtleben Chemie Gmbh
(12): Zinc oxide, zinc oxide Type II, manufactured by MITSUI MINING & SMELTING CO., LTD.
(Crosslinking Aid)
(13): Trimethylolpropane trimethacrylate, Ogmont T200 (trade name), manufactured by SHIN-NAKAMURA CHEMICAL Co., Ltd.
(Lubricant)
(14): Zinc distearate, SHINACA LEAD ZS-101 (trade name), manufactured by Shinagawa Chemical industries Co., Ltd.
(Dispersant)
(15): BYK-MAX D 4221 (trade name), manufactured by BYK Japan KK.
<Production of Resin Composition Sheet>

Components in accordance with the compositions shown in Tables 1 and 2 below were melt-mixed at 160° C. using a 1.7 L-Banbury mixer, and the resulting mixture was formed into a sheet shape with a 6-inch roll machine.

Each obtained resin composition sheet was pressed so as to have a thickness of 1 mm with a press set at a temperature of 160° C., and the formed sheet after the pressing was crosslinked with an electron beam to obtain a test sample (Examples 1 to 13, Comparative Examples 1 to 12). The crosslinking using an electron beam was conducted at an accelerating voltage of 750 keV under the condition of 80 kGy or 120 kGy.
[Performance Evaluation]

The following performance evaluation was performed using each test sample produced as described above.
<Slippage Evaluation>

Each test sample (Examples 1 to 13, Comparative Examples 1 to 12) was used for measuring the dynamic coefficient of friction in accordance with the method of JIS K 7125: 1999 under the following conditions.

Each test sample was cut into a length of 320 mm, a width of 200 mm, and a thickness of 1 mm, a 100 mm square low density polyethylene sheet (model number: UBEC 130, manufactured by UBE-MARUZEN POLYETHYLENE) was superimposed on the resulting test sample, and a 100 mm square acrylic plate was further superimposed on the low density polyethylene sheet. A test load (30 N) was placed on the acrylic plate, the low density polyethylene sheet was drawn at a tension rate of 100 mm/min, and the frictional force generated between each test sample and the low density polyethylene sheet during movement for a measurement distance of 80 mm was measured to determine the dynamic coefficient of friction (before heating).

Further, each test sample used for the measurement was heated at 50° C. for 2 hours and then allowed to stand until the temperature of each test sample reached room temperature, and the dynamic coefficient of friction (after heating) was measured again under the same conditions. From the obtained dynamic coefficients of friction (before heating and after heating), the value of the ratio of the dynamic coefficient of friction after heating to the dynamic coefficient of friction before heating (dynamic coefficient of friction after heating/dynamic coefficient of friction before heating) was calculated, and the obtained value was compared with the following evaluation criteria to evaluate the slippage. The fact that this value is large indicates deterioration of the slippage caused by heating.
—Evaluation Criteria—
A: The value was less than 1.2.
B: The value was 1.2 or more and less than 1.5.
C: The value was 1.5 or more.
<Crosslinkability Evaluation>

Each test sample (Examples 1 to 13, Comparative Examples 1 to 12) was taken in an amount of 0.1 g and used as a sample, and a test was performed in accordance with the method specified in Japanese Automotive Standards Organization (JASO) D618 6.14.2. Specifically, the sample was put into a test tube and 20 mL of xylene was added thereto and the content was heated at 120° C. for 24 hours. After that, the sample was taken out, dried for 6 hours in a dry oven at 100° C., and then allowed to cool until the temperature reached a normal temperature (23° C.), and thereafter its mass was weighed accurately. The percentage of the mass of the sample from the immersion in xylene to end of the drying with respect to the mass of the sample before the immersion in xylene ([mass of sample from immersion in xylene to end of drying/mass of sample before immersion in xylene]×100) was regarded as gel fraction and compared with the following criteria to evaluate the crosslinkability.

—Evaluation Criteria—
A: Gel fraction was 70% or more.
B: Gel fraction was 50% or more and less than 70%.
C: Gel fraction was less than 50%.

<Heat Resistance Evaluation>

The heat resistance was evaluated with the continuous heat resistance temperature in accordance with the method specified in Japanese Automotive Standards Organization (JASO) D 618. Specifically, each test sample (Examples 1 to 13, Comparative Examples 1 to 12) was punched into a dumbbell No. 3 shape described in JIS K 6251: 2017 to form a test piece, and an aging test was performed at each temperature of 170° C., 180° C., 190° C., and 200° C. The time until the sample was broken when the tensile elongation was 100% (in a state in which the elongated sample had a length 2 times the original length) was determined, and the temperature at which the sample was broken at 10,000 hours when the tensile elongation was 100% was determined using an Arrhenius plot, and the temperature was regarded as the heat-resistant life temperature. The heat-resistant life temperature was compared with the following criteria to evaluate the heat resistance.

—Evaluation Criteria—
A: The temperature was 151° C. or higher.
B: The temperature was 150° C. or higher and lower than 151° C.
C: The temperature was lower than 150° C.

Tables 1 and 2 show the obtained results collectively.

TABLE 1

|  | Ex. 1 | Ex. 2 | Ex. 3 | Ex. 4 | Ex. 5 | Ex. 6 | Ex. 7 |
|---|---|---|---|---|---|---|---|
| (1) Ethylene-vinyl acetate copolymer 1 | 100 | 90 | 90 | — | 90 | 90 | — |
| (2) Ethylene-vinyl acetate copolymer 2 | — | — | — | 90 | — | — | 90 |
| (3) Maleic acid-modified polyethylene | — | 10 | 10 | 10 | 10 | 10 | 10 |
| (4) Low density polyethylene | — | — | — | — | — | — | — |
| (5) Bromine-based flame retardant | 30 | 25 | 24 | 30 | 30 | 25 | 30 |
| (6) Antimony trioxide | 10 | 8 | 12 | 10 | 15 | 8 | 10 |
| (7) Imidazole-based antioxidant | 16 | 14 | 20 | 20 | 24 | 16 | 16 |
| (8) Phenol-based antioxidant | 2 | 2 | 1 | 1 | 1 | 2 | 1 |
| (9) Thioether-based antioxidant | 0.8 | 0.9 | 0.5 | 0.5 | 0.3 | 0.6 | 0.5 |
| (10) Copper inhibitor | — | — | — | — | — | — | — |
| (11) Zinc sulfide | — | — | — | — | — | — | 5 |
| (12) Zinc oxide | — | — | — | — | — | 3 | — |
| (13) Crosslinking aid | 4 | 4 | 4 | 4 | 4 | 4 | 4 |
| (14) Lubricant | 1 | 1 | 1 | 1 | 1 | 1 | 1 |
| (15) Dispersant | — | — | — | — | — | — | — |
| Total of antioxidants (7) to (12) | 18.8 | 16.9 | 21.5 | 21.5 | 25.3 | 21.6 | 22.5 |
| Irradiation dose (kGy) | 120 | 120 | 120 | 120 | 120 | 120 | 80 |
| Slippage | B | B | A | A | A | A | A |
| Crosslinkability | B | B | A | A | A | A | B |
| Heat resistance | B | B | B | B | B | B | B |

|  | Ex. 8 | Ex. 9 | Ex. 10 | Ex. 11 | Ex. 12 | Ex. 13 |
|---|---|---|---|---|---|---|
| (1) Ethylene-vinyl acetate copolymer 1 | — | 100 | 90 | — | — | — |
| (2) Ethylene-vinyl acetate copolymer 2 | 90 | — | — | 90 | 90 | 90 |
| (3) Maleic acid-modified polyethylene | 5 | — | 10 | 10 | 10 | 5 |
| (4) Low density polyethylene | 5 | — | — | — | — | 5 |
| (5) Bromine-based flame retardant | 30 | 30 | 25 | 30 | 30 | 30 |
| (6) Antimony trioxide | 10 | 10 | 8 | 10 | 10 | 10 |
| (7) Imidazole-based antioxidant | 18 | 16 | 14 | 20 | 16 | 18 |
| (8) Phenol-based antioxidant | 2 | 2 | 2 | 1 | 1 | 2 |
| (9) Thioether-based antioxidant | 0.4 | 0.8 | 0.9 | 0.5 | 0.5 | 0.4 |
| (10) Copper inhibitor | — | — | — | — | — | — |
| (11) Zinc sulfide | — | — | — | — | 5 | — |
| (12) Zinc oxide | 5 | — | — | — | — | 5 |
| (13) Crosslinking aid | 4 | 4 | 4 | 4 | 4 | 4 |
| (14) Lubricant | 1 | 1 | 1 | 1 | 1 | 1 |
| (15) Dispersant | — | 3 | 1 | 3 | 2 | 6 |
| Total of antioxidants (7) to (12) | 25.4 | 18.8 | 16.9 | 21.5 | 22.5 | 25.4 |
| Irradiation dose (kGy) | 120 | 120 | 120 | 120 | 80 | 120 |
| Slippage | A | B | B | A | A | A |
| Crosslinkability | B | B | B | A | B | B |
| Heat resistance | B | A | A | A | A | A |

Remarks: 'Ex.' means Example according to this invention.

TABLE 2

|  | CEx. 1 | CEx. 2 | CEx. 3 | CEx. 4 | CEx. 5 | CEx. 6 | CEx. 7 |
|---|---|---|---|---|---|---|---|
| (1) Ethylene-vinyl acetate copolymer 1 | 100 | 90 | 90 | — | — | — | 95 |
| (2) Ethylene-vinyl acetate copolymer 2 | — | — | — | 90 | 90 | 90 | — |
| (3) Maleic acid-modified polyethylene | — | 10 | 10 | 5 | 10 | 10 | 5 |
| (4) Low density polyethylene | — | — | — | 5 | — | — | — |
| (5) Bromine-based flame retardant | 30 | 30 | 30 | 30 | 30 | 24 | 25 |
| (6) Antimony trioxide | 15 | 10 | 10 | 10 | 10 | 12 | 8 |
| (7) Imidazole-based antioxidant | 12 | 12 | 12 | 10 | 12 | 7 | 8 |
| (8) Phenol-based antioxidant | 4 | 5 | 3 | 3 | 4 | 2 | 2 |
| (9) Thioether-based antioxidant | 3 | 0.3 | 2 | 0.1 | 2 | 0.8 | 4 |
| (10) Copper inhibitor | 1 | — | 1.5 | 2 | 2 | 2 | 2 |
| (11) Zinc sulfide | 4 | — | — | — | — | 5 | — |
| (12) Zinc oxide | — | — | — | — | — | — | — |
| (13) Crosslinking aid | 4 | 4 | 4 | 4 | 4 | 4 | 4 |
| (14) Lubricant | 1 | 1 | 1 | 1 | 1 | 1 | 1 |
| (15) Dispersant | — | — | — | — | — | — | — |
| Total of antioxidants (7) to (12) | 24 | 17.3 | 18.5 | 15.1 | 20 | 16.8 | 16 |
| Irradiation dose (kGy) | 120 | 120 | 120 | 120 | 120 | 120 | 80 |
| Slippage | C | A | C | A | C | B | C |
| Crosslinkability | B | B | B | B | B | B | B |
| Heat resistance | B | C | B | C | B | C | B |

|  | CEx. 8 | CEx. 9 | CEx. 10 | CEx. 11 | CEx. 12 |
|---|---|---|---|---|---|
| (1) Ethylene-vinyl acetate copolymer 1 | 95 | — | 90 | 90 | 90 |
| (2) Ethylene-vinyl acetate copolymer 2 | — | — | — | — | — |
| (3) Maleic acid-modified polyethylene | 5 | — | 10 | 10 | 10 |
| (4) Low density polyethylene | — | 100 | — | — | — |
| (5) Bromine-based flame retardant | 25 | 25 | 30 | 30 | 25 |
| (6) Antimony trioxide | 8 | 8 | 10 | 10 | 8 |
| (7) Imidazole-based antioxidant | 8 | 2 | 5 | 18 | 14 |
| (8) Phenol-based antioxidant | 2 | 2 | 14 | 2 | 20 |
| (9) Thioether-based antioxidant | 4 | 0.5 | 0.4 | — | 0.5 |
| (10) Copper inhibitor | 2 | 6 | — | — | — |
| (11) Zinc sulfide | — | — | — | — | — |
| (12) Zinc oxide | — | — | — | 5 | — |
| (13) Crosslinking aid | 4 | 4 | 4 | 4 | 4 |
| (14) Lubricant | 1 | 1 | 1 | 1 | 1 |
| (15) Dispersant | — | — | — | — | — |
| Total of antioxidants (7) to (12) | 16 | 10.5 | 19.4 | 20 | 34.5 |
| Irradiation dose (kGy) | 120 | 120 | 120 | 120 | 120 |
| Slippage | C | A | A | A | B |
| Crosslinkability | B | B | B | B | C |
| Heat resistance | B | C | C | C | B |

Remarks: 'CEx.' means Comparative Example.

NOTES IN TABLES

The content of each component in Tables is based on a mass part. The expression "-" means that the corresponding component is not included.

From Table 2, the resin composition sheets using a resin composition that did not satisfy the specifications of the present invention were inferior in at least one evaluation item of slippage, crosslinkability, and heat resistance.

In contrast, it is apparent from the results in Table 1 that the resin composition sheet prepared using the resin composition of the present invention was excellent in all the evaluation items. From the above, it can be seen that the resin composition of the present invention can realize excellent characteristics as a resin-coating material layer for a vehicle wire harness.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A resin composition, comprising:
an ethylene-vinyl acetate copolymer resin as a resin component;
an imidazole compound, a phenol compound, and a thioether compound as an antioxidant; and
a bromine compound and an antimony compound as a flame retardant, wherein the resin composition has a content of the imidazole compound of 14 to 24 parts by mass, a content of the phenol compound of 1.0 to 2.0 parts by mass, a content of the thioether compound of 0.3 to 0.9 parts by mass, a content of the bromine compound of 15 to 30 parts by mass, and a content of the antimony compound of 5 to 15 parts by mass with respect to 100 parts by mass of a total content of the resin component in the resin composition.

2. The resin composition according to claim 1, comprising 0.5 to 6.0 parts by mass of a dispersant with respect to 100 parts by mass of the total content of the resin component in the resin composition.

3. The resin composition according to claim 1, comprising a maleic acid-modified polyethylene resin and/or a low density polyethylene resin as the resin component.

4. The resin composition according to claim 1, wherein the proportion of a vinyl acetate component in the ethylene-vinyl acetate copolymer resin is 30 mass % or less.

5. The resin composition according to claim 1, wherein a total content of the antioxidants with respect to 100 parts by mass of the total content of the resin component in the resin composition is 20 to 26 parts by mass.

6. The resin composition according to claim 1, comprising at least one kind of a crosslinking aid and a processing aid.

7. The resin composition according to claim 1, to be used in a vehicle wire harness.

8. A resin-coating material obtained by crosslinking the resin composition according to claim 1.

9. An insulated wire, comprising an insulating film including the resin-coating material according to claim 8.

10. A vehicle wire harness, comprising the insulated wire according to claim 9.

11. A method of producing an insulated wire to be used in a vehicle wire harness, the method comprising a step of extrusion-coating a conductor with the resin composition according to claim 1 to provide a resin composition layer and irradiating the resin composition layer with an electron beam of 80 to 250 kGy.

* * * * *